Nov. 13, 1951  F. J. MULHOLLAND  2,575,185
AIRFOIL
Filed Feb. 24, 1950

INVENTOR.
Frank J. Mulholland
BY
Charles S. Wilson
ATTORNEY.

Patented Nov. 13, 1951

2,575,185

UNITED STATES PATENT OFFICE 2,575,185

AIRFOIL

Frank J. Mulholland, Hempstead, N. Y., assignor to Republic Aviation Corporation, Farmingdale, N. Y., a corporation of Delaware Application February 24, 1950, Serial No. 145,982

2 Claims. (Cl. 244—35)

This invention relates to airfoils and proposes a planform and construction of airfoil that will reduce or substantially lessen the tendency thereof to "stall," or lose lift, at its outer end portion or tip which, under certain operating conditions, may be a marked characteristic of airfoils prior hereto.

Moreover, the present airfoil construction proposes to improve the stability of a swept-back airfoil, i. e., an airfoil disposed about a characteristic line not normal to the plane of symmetry of the airplane, by effectively reducing or inhibiting the thickness of the boundary layer of air enveloping the airfoil.

Additionally, the instant planform and construction contemplates the reduction or substantial elimination of interference drag induced at the junction between the root end of the airfoil and its supporting structure which in predecessor airfoils has generally been appreciable.

With the above and other objects in view as will become apparent, this invention consists in the combination, construction and geometrical arrangement of airfoil features all as hereinafter more fully described, claimed and illustrated in the accompanying drawings wherein:

Figure 1:
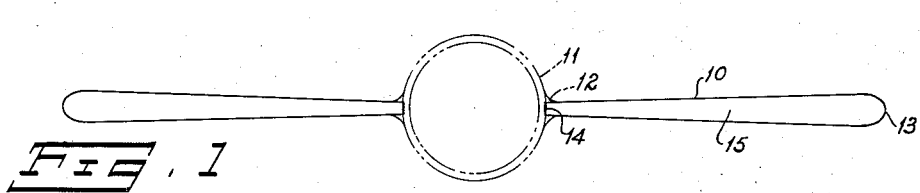
Fig. 1 is a leading edge view of a pair of airfoils or wings embodying the present invention shown in conjunction with a fuselage.
Figure 2:
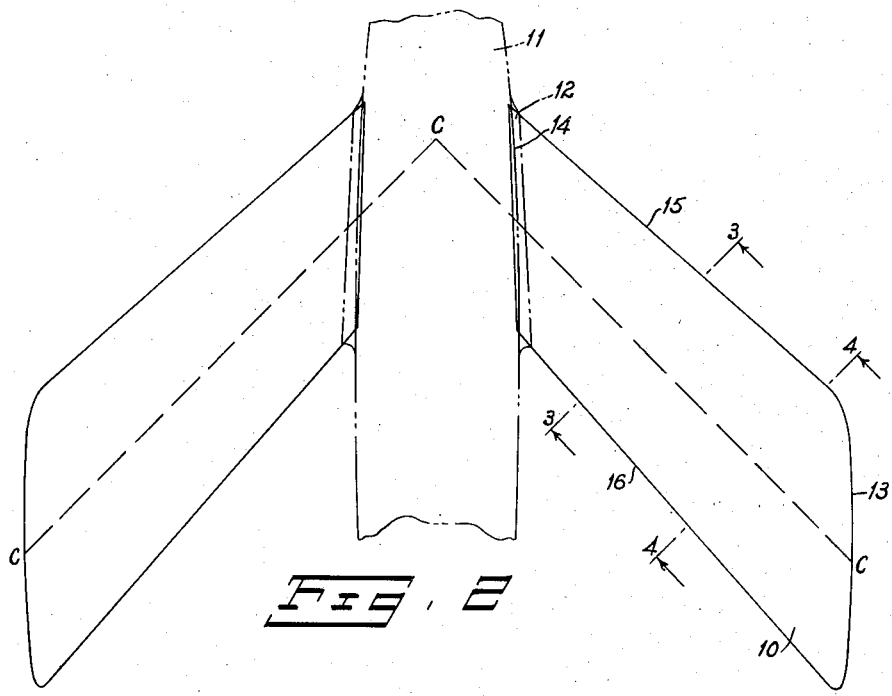
Fig. 2 is a plan view thereof and illustrates the planform of the airfoil or wing.

While this invention is applicable to all types of airfoils it has its principal use in wings and will be discussed and described as applied to the wing of an airplane.

Heretofore, wings usually have been made to taper both in width and thickness, outwardly from the inner or root end, i. e., where the wing joins the fuselage, toward and to the outer end or wing tip. Therefore, a wing so constructed is substantially wider and thicker at the junction of the wing with the fuselage.

Among its other disadvantages, a wing constructed as aforesaid, has two principal disadvantages. First, since the wing is relatively narrow at its outer end or tip, this portion of the wing will tend to stall or lose lift at low speeds before the inboard portion thereof. Inasmuch as the degree or amount of stall is rarely, if ever, equal on both wing tips, the result of such a stall not only adversely affects the stability of the airplane but also the operation of the control surfaces. Second, interference drag is usually present where the wing joins the fuselage and the greater the wing area at this point the greater will be the interference drag induced thereby. Hence, in prior airplane wings where the wing root is both wide and thick, there is a large wing area adjacent the fuselage and as a consequence, a substantial amount of interference drag is induced or developed over that area during flight.

With the advent of high speed airplanes operating immediately below, at or above sonic speeds, wings not only have been tapered as above described but have been disposed about a characteristic line not normal to the plane of symmetry of the airplane. A wing thus mounted on the fuselage is commonly called "swept" or "swept-back." A swept or swept-back wing has served to increase or emphasize the disadvantages heretofore noted in that it is usually wider and thicker at its root end and narrower and thinner at its tip. Consequently, a tapered swept-back wing is more unstable and develops or induces greater interference drag.

It is possible to correct the tendency to stall at the tip in a wing which has its characteristic line normal to the plane of symmetry of the airplane by increasing the camber of the tip section, but this means of correction is ineffectual in swept wings.

The instant invention proposes a planform and construction of an airplane wing that will substantially reduce if not eliminate the foregoing disadvantages of prior wings. Since these disadvantages are more apparent or pronounced in tapered, swept-back wings, this invention has been illustrated and described as applied to a wing of this type, although it may be incorporated equally as well in a wing or airfoil having a charactertistic line normal to the plane of symmetry of the airplane.

An airfoil or wing embodying this invention has its outer end portion or tip substantially wider than its root end. Thus, by providing the wing with an inverse taper, i. e., a taper resulting from converging the edges of the wing inwardly from the wing tip toward the wing root, the wing tip is wider than the inboard portion of the wing to the end that the tendency of the wing to stall at its tip is radically reduced and a more stable wing results.

Additionally, the thickness of the wing is gradually and progressively reduced inboard of the wing tip, so that the wing tip is dimensionally thicker than the root end thereof.

While a wing constructed in accordance with the present invention gradually reduces dimensionally in thickness as it approaches its root end, it in fact, maintains an aerodynamically, uniform thickness. By this is meant the ratio of maximum thickness to the chord of the wing is constant.

Reference being had more particularly to the drawings 10 designates an airplane wing or airfoil constructed in accordance with the present invention. This wing 10 is shown in conjunction with a fuselage 11 of any type and since this fuselage per se forms no part of the subject invention it is shown in phantom lines as are also the fillets 12 which merge the surfaces of the wings 10 and fuselage 11 one with the other.

In order to provide the wing with a planform having an inverse taper, i. e., a taper resulting from the convergence of the leading and trailing edges of the wing inwardly from the outer end or tip to the inner end or root, the outboard extremity or wing tip 13 is made substantially wider than its inboard extremity or root 14. In other words, the chord C1 (a straight line normal to the characteristic line C—C of the wing 10 and extending between the leading edge 15 and the trailing edge 16 thereof) nearest the tip 13 of the wing is longer than the chord nearest the root 14. It is preferred that the length of the chord at the wing tip 13 exceed the length of the chord at the wing root 14 by 50%. In other words, these relative lengths of the chords of the inboard and outboard extremities of the wing 10 may be expressed in terms of ratio as 1:1.5. This ratio, of course, is only illustrative and other ratios between the root and tip chords of the wing 10 may be possibly employed. Ratios of 1:2 or 1:3 between these chord lengths may be successfully employed, the only requirement being that the length of the chord at the wing tip 13 exceed that at the wing root 14.

Figure 3:
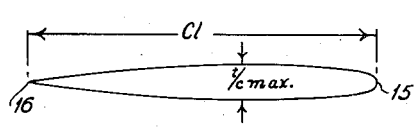
Fig. 3 is a profile of the instant airfoil at line 3—3 of Fig. 2.
Figure 4:
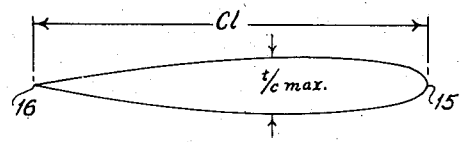
Fig. 4 is a profile at line 4—4 of Fig. 2.

The wing 10 is also dimensionally thicker at its tip 13 than at its root 14 as shown in Fig. 1. This gradual increase in the thickness of the wing from its inboard end 14 to its outboard end 13 results from employing a constant or uniform ratio between the maximum thickness $t./c.$ max. of the wing and the chord C1. Thus in any profile of the wing 10 taken in a plane normal to the characteristic line C—C the ratio of the maximum thickness $t./c.$ max. to the length of the chord C1 will be a constant. In the profiles shown in Figs. 3 and 4 and in all other profiles the ratio of $t./c.$ max. to C1 is 1:10, i. e., the maximum thickness of the wing is 10% of its chord at any point in the wing span. While 10% is illustrative of one ratio or constant between the maximum thickness of the wing and the length of the chord, it is to be understood that any ratio that will provide suitable flight characteristics for the airplane may be used.

As used herein "characteristic line" denotes a line through constant percentage points on the chords of all of the sections comprising the airfoil. For example it can be a line extending from tip to the root end of a wing passing through points situated aft of the leading edge 25% of the length of the chord of each section; or it may be a line through any other series of points situated on the chord a selected percentage of the chord length aft of the leading edge. The angular position of the characteristic line to the plane of symmetry of the airplane determines the position of the wing with reference to the fuselage and defines the angle of sweep back, if any, of the wing.

It has been found that a wing constructed in accordance with this invention substantially counteracts the tendency of the wing to stall at its tip and this inverse taper is especially effective for that purpose in a swept wing.

What is claimed is:

1. An airplane wing having its characteristic line extending rearwardly at an acute angle to the plane of symmetry of the airplane, its leading and trailing edges disposed on opposite sides of said characteristic line and diverging from root to tip, and its thickness gradually increasing dimensionally from root to tip at a constant thickness ratio.

2. An airplane wing having its characteristic line extending rearwardly at an acute angle to the plane of symmetry of the airplane, its leading and trailing edges disposed on opposite sides of said characteristic line and diverging from root to tip, and its thickness increasing dimensionally from root to tip.

FRANK J. MULHOLLAND.

REFERENCES CITED

The following references are of record in the file of this patent:

UNITED STATES PATENTS

| Number | Name | Date |
|---|---|---|
| 1,839,349 | Sigrist | Jan. 5, 1932 |
| 1,859,568 | Lesh | May 24, 1932 |

FOREIGN PATENTS

| Number | Country | Date |
|---|---|---|
| 210,181 | Great Britain | Jan. 31, 1924 |
| 286,516 | Great Britain | Mar. 8, 1928 |
| 266,296 | Italy | July 26, 1929 |